(No Model.)
T. EGLESTON.
CRUCIBLE, MUFFLE, &c.
No. 284,287.     Patented Sept. 4, 1883.
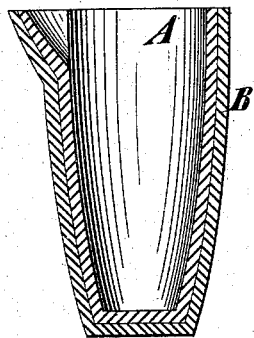
Witnesses:
James R Bowen.
Alfred L. Brown.
Inventor,
Thomas Egleston,
by his attorney,
Edwin H. Brown.

UNITED STATES PATENT OFFICE.

THOMAS EGLESTON, OF NEW YORK, N. Y.

CRUCIBLE, MUFFLE, &c.

SPECIFICATION forming part of Letters Patent No. 284,287, dated September 4, 1883.

Application filed March 5, 1883. (No model.)

*To all whom it may concern:*

Be it known that I, THOMAS EGLESTON, of New York, in the county and State of New York, have invented a certain new and useful Improvement in Crucibles, Muffles, and other vessels in which metals are melted, reduced, or distilled, of which the following is a specification.

The object of my improvement is to produce a vessel having the interior surface of such character that it will not be chemically or mechanically effected by the contents, and the exterior surface of such nature that it will not be materially injured by the heat to which it will be subjected when the vessel is in use, and also of such nature that melted ashes of fuel will not become so firmly united with or adhered to it as to require to be removed by blows, which would endanger the vessel.

The accompanying drawing represents a central vertical section of a vessel embodying my improvement.

The interior surface, A, of this vessel is essentially basic. It may be made of baryta, strontia, lime, magnesia, alumina, or any two or more of these materials, or a form of carbon—such, for instance, as graphite, anthracite, gas-carbon, or coke—mixed with any of the basic refractory materials. The material employed may be pulverized and mixed with water or other liquid to form a paste, and then may be shaped in molds or by any other suitable means.

The exterior surface, B, of the vessel may be made of acid refractory materials—such, for instance, as silicate of baryta, strontia, lime, magnesia, or alumina, or of the elements of which these materials are composed. Where the vessel will be exposed to highly corrosive ashes this surface may be made of one or more of these silicates or mixtures, combined in variable proportions with one or more of the basic materials above enumerated. The materials employed for this surface may be comminuted and mixed with water or other liquid to form a paste, and may be shaped in molds or by any other suitable means. Either surface may be made first and the other formed around it, or both may be formed together.

In some cases both the exterior and interior surfaces may be made essentially of basic material; but even in that case, they will be constituted differently from each other. In such cases the two surfaces may be differently constituted by making the surfaces of different basic materials, or of differently-constituted basic materials.

What I claim as my invention, and desire to secure by Letters Patent, is—

A crucible, muffle, or other vessel used in melting, reducing, or distilling metals having the interior surface made essentially of basic refractory material, and the exterior surface essentially of acid refractory material, or having its two surfaces made of differently-constituted basic materials or of different basic materials, substantially as specified.

THOS. EGLESTON.

Witnesses.
JAMES P. BOWEN,
T. J. KEANE.

It is hereby certified that in Letters Patent No. 284,287, granted September 4, 1883, upon the application of Thomas Egleston, of New York, N. Y., for an improvement in "Crucibles, Muffles, &c.," an error appears requiring correction, as follows: in line 12 of the printed specification the word "effected" should read *affected;* and that the patent should be read with this correction therein to make it conform to the record of the case in the Patent Office.

Signed, countersigned, and sealed this 11th day of September, A. D. 1883.

[SEAL.]

M. L. JOSLYN,
*Acting Secretary of the Interior.*

Countersigned:

E. M. MARBLE,
*Commissioner of Patents.*